United States Patent
Alkalay et al.

(10) Patent No.: US 11,504,725 B2
(45) Date of Patent: Nov. 22, 2022

(54) ROTARY SPRINKLER FOR VARYING IRRIGATION PATTERN

(71) Applicant: CLEVER WATER SPRINKLER TECHNOLOGIES LTD., Tzoran (IL)

(72) Inventors: Uri Alkalay, Tzoran (IL); Avihai Simner, Tzoran (IL)

(73) Assignee: CLEVER WATER SPRINKLER TECHNOLOGIES LTD., Tzoran (IL)

(*) Notice: Subject to any disclaimer, the term of this patent is extended or adjusted under 35 U.S.C. 154(b) by 465 days.

(21) Appl. No.: 16/490,259

(22) PCT Filed: Mar. 1, 2018

(86) PCT No.: PCT/IL2018/050235
§ 371 (c)(1),
(2) Date: Aug. 30, 2019

(87) PCT Pub. No.: WO2018/163155
PCT Pub. Date: Sep. 13, 2018

(65) Prior Publication Data
US 2020/0070186 A1 Mar. 5, 2020

Related U.S. Application Data

(60) Provisional application No. 62/467,156, filed on Mar. 5, 2017.

(51) Int. Cl.
*B05B 1/26* (2006.01)
*B05B 3/04* (2006.01)
*A01G 25/16* (2006.01)

(52) U.S. Cl.
CPC .............. *B05B 1/267* (2013.01); *A01G 25/16* (2013.01); *B05B 3/0409* (2013.01)

(58) Field of Classification Search
CPC ....... B05B 1/267; B05B 3/0409; B05B 3/0454; A01G 25/16
See application file for complete search history.

(56) References Cited

U.S. PATENT DOCUMENTS 2,805,098 A * 9/1957 Hurley ............... B05B 3/0413
239/533.1
3,272,437 A 9/1966 Coson
(Continued)

FOREIGN PATENT DOCUMENTS

CN 2136074 Y 6/1993
CN 201140147 Y 10/2008
(Continued)

OTHER PUBLICATIONS

International Search Report and Written Opinion from International Application No. PCT/IL2018/050235 dated Jun. 6, 2018.
(Continued)

*Primary Examiner* — Joseph A Greenlund
(74) *Attorney, Agent, or Firm* — Dorsey & Whitney LLP (57) ABSTRACT

A rotary sprinkler comprises a rotatable irrigation head with one or more nozzles, associated with liquid feed lines, which extend thereto from a sprinkler base housing, and further comprises a static biasing control base located below the irrigation head, e.g. between the sprinkler base housing and the irrigation head. The sprinkler can comprise a flow regulator arm, whose movement, at least indirectly, results in reducing the cross-sectional area of liquid flow towards at least one of the nozzles, and a flow deflector arm configured to interfere with a liquid jet discharged from at least one of the nozzles in order to affect the angle and range of the liquid jet. The static biasing control base can comprise an array of biasing elements, which can bias a cam follower configured to rotate together with the irrigation head and transfer its rotational displacement to the flow regulator arm and flow
(Continued)

deflector arm, e.g. through respective gear elements. The gear elements can be adjusted to control a ratio between the extent of deflection of the two arms due to the rotation of the cam follower. The rotatable irrigation head can comprise a cover for preventing exposure of the dynamic control elements to the exterior of the sprinkler.

7 Claims, 5 Drawing Sheets

(56) References Cited

U.S. PATENT DOCUMENTS

| | | | | |
|---|---|---|---|---|
| 3,575,347 A * | 4/1971 | Carlson | B05B 15/74 | |
| | | | 239/206 | |
| 3,654,817 A | 4/1972 | Kane | | |
| 3,785,565 A * | 1/1974 | Perry | B05B 3/0431 | |
| | | | 239/206 | |
| 3,878,990 A * | 4/1975 | Geraudie | B05B 3/0472 | |
| | | | 239/DIG. 1 | |
| 4,540,125 A * | 9/1985 | Gorney | B05B 3/021 | |
| | | | 239/230 | |
| 4,613,077 A | 9/1986 | Aronson | | |
| 4,632,312 A * | 12/1986 | Premo | B05B 3/0472 | |
| | | | 239/230 | |
| 4,637,549 A * | 1/1987 | Schwartzman | B05B 3/021 | |
| | | | 239/230 | |
| 5,086,977 A * | 2/1992 | Kah, Jr. | B05B 1/262 | |
| | | | 239/206 | |
| 5,148,991 A * | 9/1992 | Kah, Jr. | B05B 3/16 | |
| | | | 239/242 | |
| 5,199,646 A * | 4/1993 | Kah, Jr. | B05B 3/0431 | |
| | | | 239/521 | |
| 5,248,093 A * | 9/1993 | Pleasants | B05B 3/16 | |
| | | | 239/DIG. 1 | |
| 5,267,689 A * | 12/1993 | Forer | B05B 3/0472 | |
| | | | 239/206 | |
| 5,769,322 A * | 6/1998 | Smith | B05B 15/625 | |
| | | | 239/236 | |
| 6,364,217 B1 * | 4/2002 | Lockwood | B05B 3/0431 | |
| | | | 239/206 | |
| 6,651,905 B2 * | 11/2003 | Sesser | B05B 3/0486 | |
| | | | 239/231 | |
| 7,988,071 B2 * | 8/2011 | Bredberg | B05B 15/74 | |
| | | | 239/206 | |
| 8,113,443 B2 * | 2/2012 | Zur | B05B 1/30 | |
| | | | 239/231 | |
| 8,181,889 B2 * | 5/2012 | Shahak | B05B 3/021 | |
| | | | 239/206 | |
| 8,636,229 B1 * | 1/2014 | Clark | B05B 3/0409 | |
| | | | 239/206 | |
| 9,120,111 B2 * | 9/2015 | Nations | B05B 15/55 | |
| 9,205,435 B1 * | 12/2015 | Clark | B05B 3/0427 | |
| 9,227,207 B1 * | 1/2016 | Bredberg | A01G 25/00 | |
| 10,758,923 B1 * | 9/2020 | Oman | B05B 1/16 | |
| 2001/0013557 A1 * | 8/2001 | Kah, III | B05B 1/32 | |
| | | | 239/602 | |
| 2002/0092924 A1 * | 7/2002 | Ingham, Jr. | B05B 15/74 | |
| | | | 239/240 | |
| 2002/0153432 A1 * | 10/2002 | McKenzie | B05B 3/0431 | |
| | | | 239/237 | |
| 2004/0164177 A1 * | 8/2004 | Lerner | B05B 3/021 | |
| | | | 239/233 | |
| 2010/0012746 A1 * | 1/2010 | Zur | B05B 1/267 | |
| | | | 239/97 | |
| 2020/0070186 A1 * | 3/2020 | Alkalay | B05B 3/0454 | |

FOREIGN PATENT DOCUMENTS

| | | |
|---|---|---|
| CN | 102500483 A | 6/2012 |
| CN | 203279597 U | 11/2013 |
| GB | 2150862 A | 7/1985 |

OTHER PUBLICATIONS

U.S. Appl. No. 62/467,156, filed Mar. 5, 2017.

\* cited by examiner

ROTARY SPRINKLER FOR VARYING IRRIGATION PATTERN

TECHNOLOGICAL FIELD

The presently disclosed subject matter is generally in the field of irrigation sprinklers, and more particularly, rotary sprinklers for irrigation of areas with varying irrigation patterns.

BACKGROUND

One example of an irrigation sprinkler of the kind, to which the presently disclosed subject matter refers, is disclosed US 20100012746. The sprinkler comprises a housing fitted with a flow chamber accommodating a motor for rotating a sprinkler head mounted on the housing, the housing comprising a first nozzle and a second nozzle, in flow communication with the outlet end of the flow chamber. The first nozzle is fitted for discharging liquid at a substantially short range. The sprinkler further comprises a dynamic liquid deflector associated with the second nozzle, and biased by an array of biasing elements, each adapted to dynamically bias the liquid deflector to a predetermined angle, and to thereby determine a deflection angle thereof.

SUMMARY

The presently disclosed subject matter is directed to a rotary sprinkler adapted to be attached to a liquid feed port located in, or in the vicinity of, an area to be irrigated such that an irrigation liquid, e.g. water, may be introduced through a sprinkler base housing and be discharged through its irrigation head rotatable about a longitudinal vertical axis of the sprinkler.

The rotatable irrigation head of the sprinkler has one or more nozzles, associated with liquid feed lines, which extend thereto from the sprinkler base housing.

Some of the operational parameters of the sprinkler, that include the flow rate and the spread of the liquid discharged are variable for at least one of the nozzles by the operation of an irrigation control unit during the rotation of the rotatable irrigation head.

In accordance with one aspect of the presently disclosed subject matter, the irrigation control unit comprises a static biasing control base located below the irrigation head, and more particularly, between the sprinkler base housing and the irrigation head. Locating the biasing control base between the sprinkler base housing and the rotatable irrigation head results in that the sprinkler is compact in the vertical direction.

The irrigation control unit further comprises dynamic control elements, a majority of which are located within the irrigation head and are rotatable therewith.

The dynamic control elements can comprise at least a flow regulating mechanism and a flow deflecting mechanism.

The flow regulator mechanism can comprise a flow regulator arm, whose movement, at least indirectly, results in reducing the cross-sectional area of liquid flow towards at least one of the nozzles.

The liquid deflector mechanism can comprise a deflector arm configured to interfere with a liquid jet discharged from at least one of the nozzles in order to affect the angle and range of the liquid jet.

The static biasing control base comprises an array of biasing elements, which can bias a cam follower configured to rotate together with the irrigation head and transfer its rotational displacement to the flow regulator arm and deflector arm, e.g. through respective gear elements. Position of the biasing elements can be adjusted to suit displacement of the dynamic control elements during rotation of the irrigation head to a desired irrigation pattern.

According to another aspect of the presently disclosed subject matter, the ratio between the extent of deflection of the two arms due to the rotation of the cam follower can be controlled by the adjustment of the corresponding gears. This enables suiting the change of the flow rate through the nozzle, obtained due to the operation of the flow regulating arm, to the interference of the deflector arm with the liquid jet and vice versa.

According to a further aspect of the presently disclosed subject matter, the sprinkler can have an adjustable angle within which the irrigation head can be rotatable, which is useful for areas, in which irrigation is not desired at certain directions.

The above-mentioned adjustments can be performed at the time of the installation of the sprinkler, which can be performed by first mounting its sprinkler base housing to the dedicated liquid feed port and then assembling with the housing the static biasing control base with the irrigation head.

The rotation of the sprinkler irrigation head can be operated by a drive accommodated within the sprinkler base housing. One example of such drive is a hydraulic motor, whose liquid flow is configured to rotate a shaft of the irrigation head. Other embodiments may be based on non-hydraulic motors, e.g. electric motor.

According to a still further aspect of the presently disclosed subject matter, the rotatable irrigation head of the rotary sprinkler can comprise a cover for preventing exposure of the dynamic control elements to the exterior of the sprinkler. The sprinkler cover can be formed with designated openings for the nozzles allowing the jet to be discharged freely therethrough, without being interfered by any elements of the sprinkler except for the liquid deflector arm.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
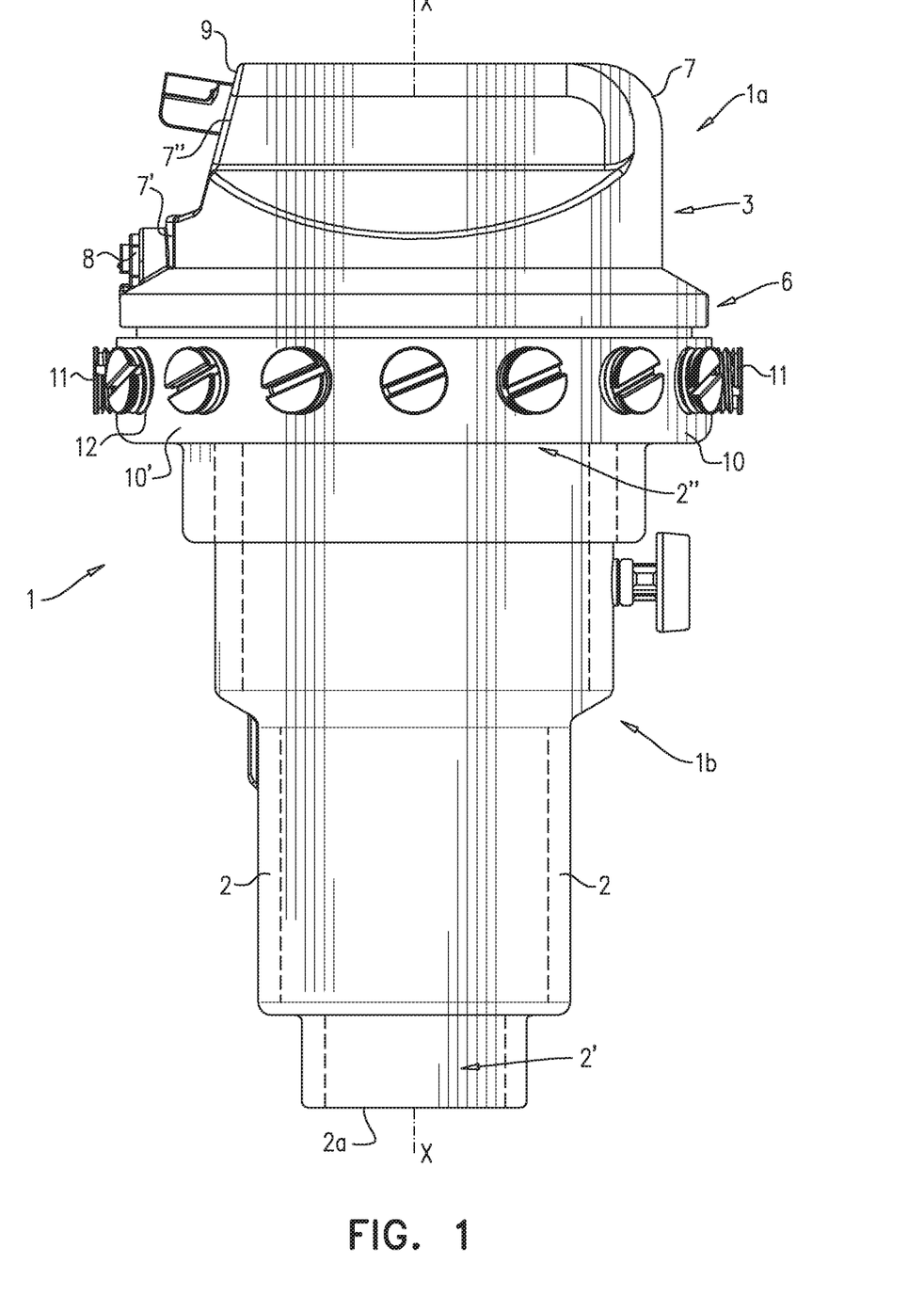
FIG. 1 is a schematic side view of a sprinkler according to one embodiment of the presently disclosed subject matter.

Referring to FIG. 1 there is provided a rotary sprinkler 1 having an essentially cylindrical body extending along a longitudinal axis X-X and comprising an upper portion 1a and a lower portion 1b each of which can be assembled separately, allowing the upper portion 1a to be rotatably mounted to the lower portion 1*b* before or after mounting of the lower portion to a liquid supply line (not shown).

The lower portion 1*b* comprises a sprinkler base housing 2 having an upstream end 2' with a sprinkler inlet 2*a* configured for being fitted to the liquid supply line, and a downstream end 2" for providing fluid communication between the sprinkler inlet and the upper portion 1*a*.

The sprinkler upper portion 1*a* comprises:

- an irrigation head 3 configured for being rotated by a drive accommodated within the sprinkler base housing 2 and to provide a short-range jet of liquid having constant flow rate and direction, and a long-range jet of liquid, whose parameters can be varied according to a predetermined irrigation pattern;
- an irrigation control unit 6 comprising a static control base 10 fixedly mounted to the sprinkler base housing 2, adjacent its downstream end 2" and under the rotatable irrigation head 3, and dynamic control elements configured to cooperate with the static control base 10 and to operate within the irrigation head 3 so as to control the flow rate and orientation of the long-range jet; and
- a neck 5 constituting an integrally assembled body with the irrigation head 3, rotatably received within the sprinkler base housing 2, and configured for serving as a central rotational shaft for the irrigation head 3 and for passing liquid from the downstream end 2" of the sprinkler base housing 2 to the irrigation head.

Figure 3:
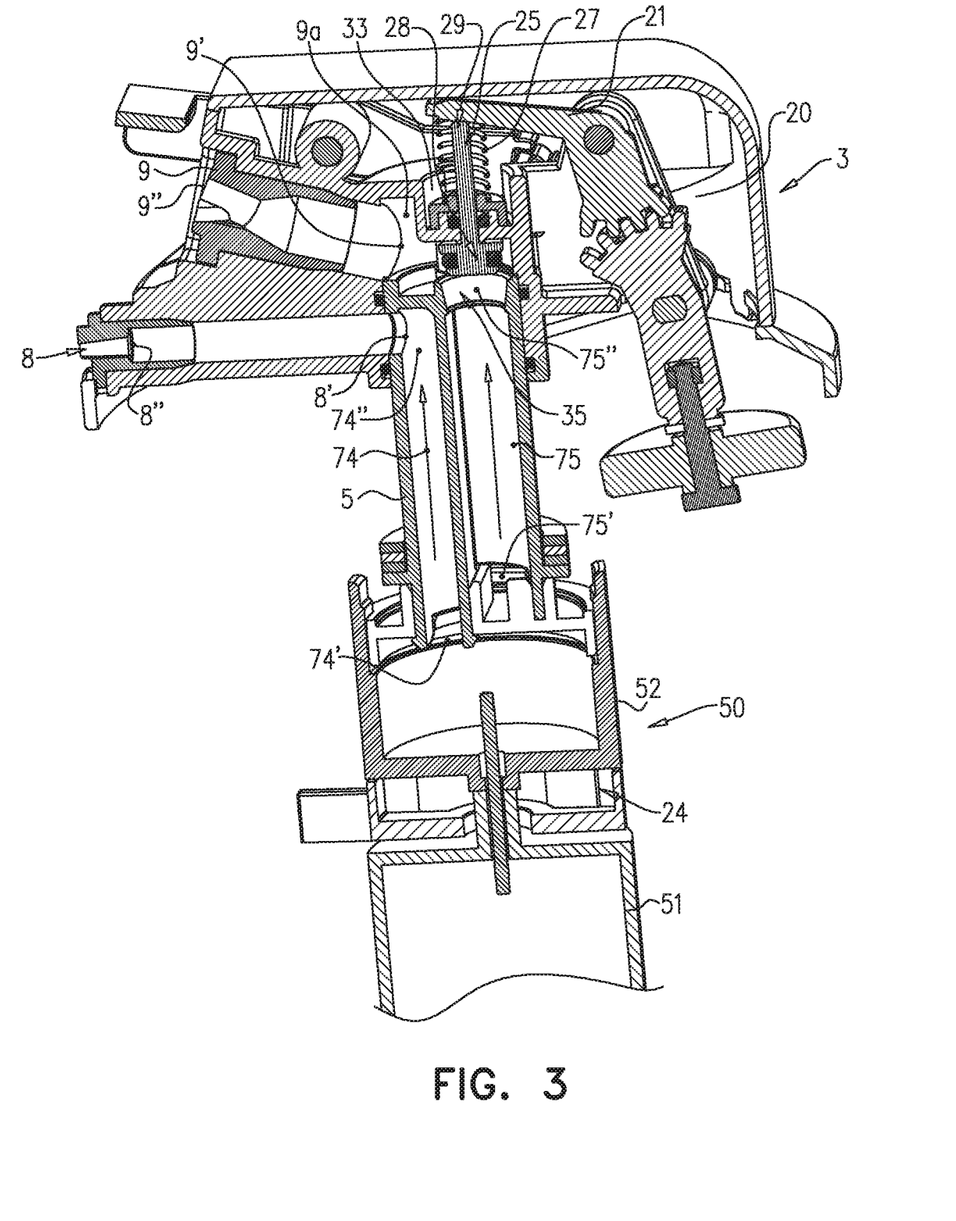
FIG. 3 is a schematic perspective illustration of the interior of an irrigation head of the sprinkler shown in FIGS. 1 and 2.
Figure 4:
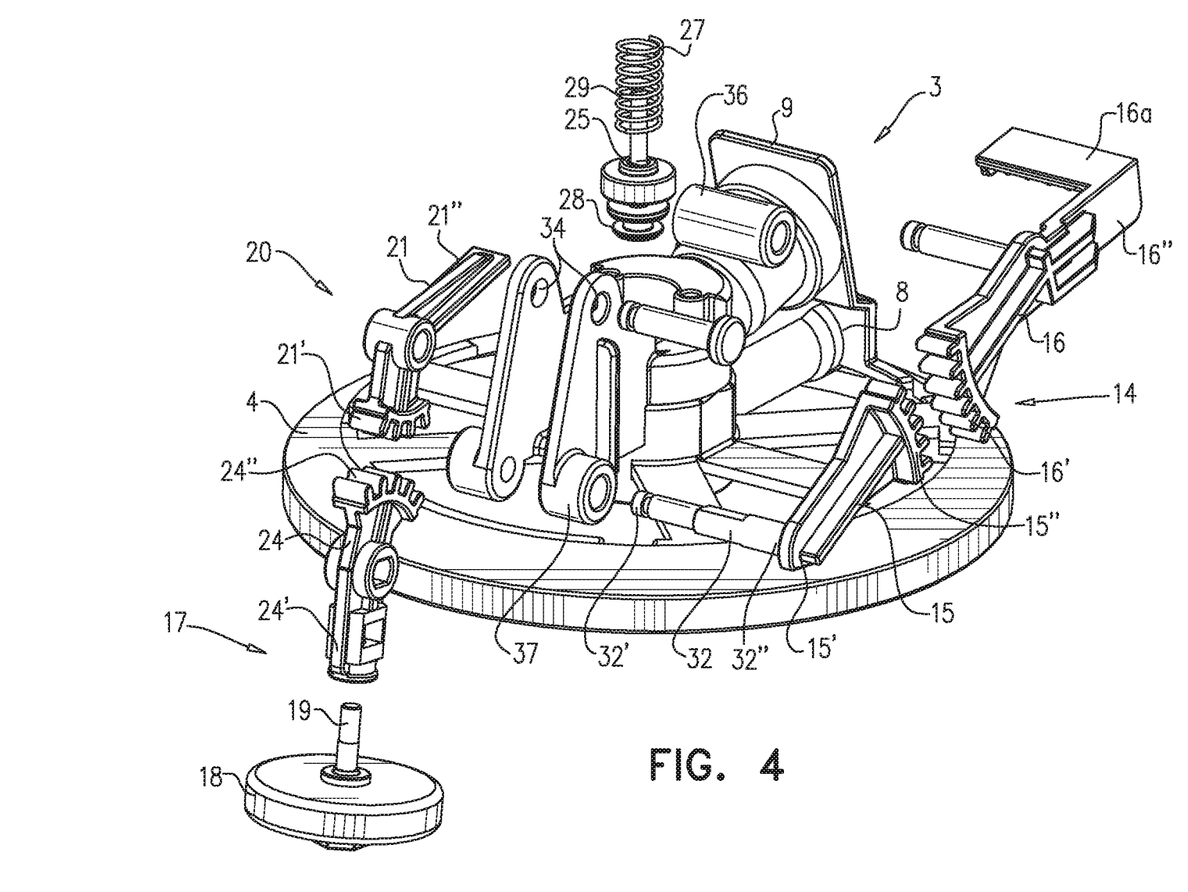
FIG. 4 is a schematic side view of dynamic elements within one embodiment of the irrigation head.

With reference to FIG. 3, in the present example, the neck 5 comprises two feed lines, 74 and 75, each having a upstream ends 74' and 75' within the sprinkler base housing 2, and downstream ends 74" and 75" within the irrigation head 3, and the irrigation head 3 has a body formed with the following:

- a first, short-range discharge nozzle 8 having a first nozzle inlet 8' merging with the downstream end 74" of the feed line 74, and a first nozzle outlet 8";
- a second, long-range discharge nozzle 9 having a second nozzle inlet 9' in fluid communication with the downstream end 75" of the feed line 75 via a flow control chamber 9*a* and a second nozzle outlet 9"; and
- with reference to FIG. 4, an irrigation head operational stage 4 having a number of engagement portions, which when engaged by the dynamic control elements of the irrigation control unit 6, allow their movement relative to the stage required for the control of the above parameters of the long-range jet. In the present example, the engagement portions of the operational stage 4 are a main pivot portion 37, a jet deflector pivot portion 36 and a flow regulator pivot portion 34.

Turning to FIG. 1, the sprinkler 1 further comprises a top cover 7 configured to be attached to the body of the irrigation head 3 so as to rotate therewith and formed with two openings 7' and 7" via which the respective outlets 8" and 9" protrude so as to allow the discharge of liquid therethrough. The shape and the orientation of each of the nozzle outlets can influence the discharged liquid jet parameters, such as: angle, spread and distance.

The static control base 10 of the irrigation control unit 6 has an annular sidewall 10' formed with a plurality of circumferentially spaced cylindrical positioning bores 12 having radially extending central axes, receiving therein biasing elements 11, which can be fixed in the corresponding bores so as to have their radially inner ends 11' spaced to different extents from the sidewall, to form a positioning profile of the control base corresponding to the predetermined irrigation pattern mentioned above. In the present example, the biasing elements 11 are in the form of screws engaging the positioning bores 12 via a thread formed therein.

Referring to FIG. 4, the dynamic control elements are the following:

- a liquid deflector 14 that comprises a deflector arm 16 pivotally articulated to the deflector pivot portion 36 of the operational stage 4;
- a flow regulator 20 that comprises a flow regulator arm 21 configured to pivot at the flow regulator pivot portion 34 and to exert a downward force on a distal end 29 of a plunger 25, biased upwardly by a biasing spring 27, to cause the movement of a proximal end 28 of the plunger into the flow control chamber 9*a* for controlling the flow rate of liquid therefrom into the long-range nozzle 9; and
- a transmission mechanism 17, configured to translate the profile formed by the ends 11' of the biasing elements 11, into the pivoting rotational movements of the liquid deflector arm 16 and flow regulator arm 21.

More particularly, the flow regulator arm 21 has a transmission-associated end 21', at which it is configured to be pivoted, and a plunger-associated end 21" configured to exert the above force on the plunger 25; the deflector arm 16 has a transmission-associated end 16', at which it is configured to be pivoted, and a deflecting end 16" with a deflecting portion 16*a*; and the transmission mechanism 17 comprises:

- a cam follower, including a disk-like roller follower 18 and a roller axle 19, on which the roller follower is rotatably mounted, so as to come in contact with the inner ends 11' of the biasing elements 11 and to thereby move radially the roller axle 19, when the cam follower is rotated together with the irrigation head 3;
- a flow-control transmission arm 24 having one end 24', with which it is mounted on the roller axle 19, and another end 24" configured to engage the transmission-associated end 21' of the flow regulator arm 21, wherein the lengths of the arms 24 and 21 and the roller follower 18 are calculated to overcome counterforces generated for example by the liquid within the flow control chamber 9*a*, the biasing spring 27 and friction; and
- a deflection-control transmission arm 15 having one end 15' with a pivot axle 32 fixed thereto, and another end 15" configured to engage the transmission-associated end 16' of the deflector arm 16, the pivot axle 32 passing through the flow-control transmission arm 24 at a location disposed between its ends 24' and 24" so as to be pivoted thereby when the end 24' of the flow-control transmission arm is moved radially by the axle 19, the free end of the pivot axle 32 is pivotally received within the main pivot portion 37 of the operational stage 4 of the irrigation head 3, and is fixed on its other end to end 15' of the deflector-control transmission arm 15.

The deflecting portion 16*a* of the deflector arm 16 is so oriented that, when the deflector arm 16 is pivoted at the pivot portion 36 to different pivoting angles corresponding to the positioning profile of the static control base 10, it selectively changes the vertical orientation of the liquid jet emitted from the long-range nozzle 9. The deflecting portion 16*a* can be formed in order to divert, split, converge, or control other parameters, such as speed and drop size of the liquid jet or portions thereof. For example: it can be essentially flat and can have grooves therein adapted for splitting the discharged liquid jet into a number of streams for better coverage of the irrigated area.

During rotation of the irrigation head 3, the roller follower 18 of the cam follower, alternately comes in contact with a biasing end 11' of a different biasing element 11, whereby the extent of obstruction and flow of liquid out of the second nozzle 9 varies according to the radial distance of each of the biasing end from the main axis X-X of the cylindrical body. The displacement of the roller follower 18 towards the main axis X-X, entails a corresponding pivotal displacement of the deflector arm 16 towards the long-range nozzle 9 extending the interference. Similarly, a displacement of the roller follower 18 away from the main axis X-X, entails a corresponding pivotal displacement of the deflector arm 16 upwards thus reducing the interference of the long-range nozzle 9.

In the described example, the ends of each pair of the above arms that are configured to engage each other, are in the form of gears.

Figure 2:
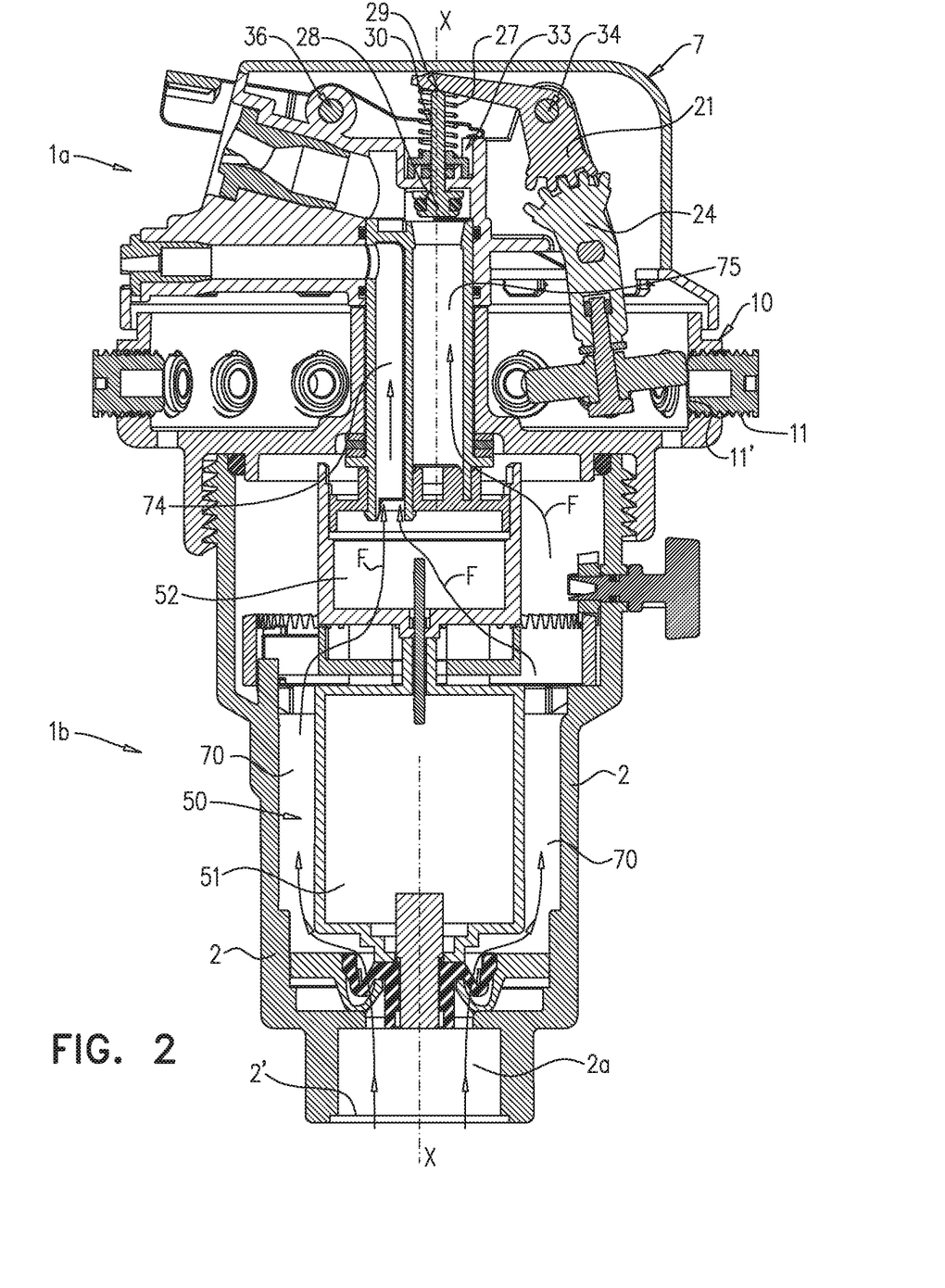
FIG. 2 is a schematic planar illustration of the interior of the sprinkler shown in FIG. 1.

Turning to FIG. 2, the sprinkler base housing 2 is formed with a flow chamber 70 in flow communication F with the first flow path 74 and the second flow path 75.

The sprinkler base housing 2 further accommodates a motor unit 50, which can be constituted by a hydraulic motor operated by a flow of liquid through a turbine housing 52. The motor unit 50 drives an axial rotation of rotatable irrigation head 3 around axis X-X by the neck 5 fitted at the upper portion of the motor unit 50.

It should be noted that the motor unit can be constituted by a non-hydraulic motor such as an electrical motor.

Figure 5:
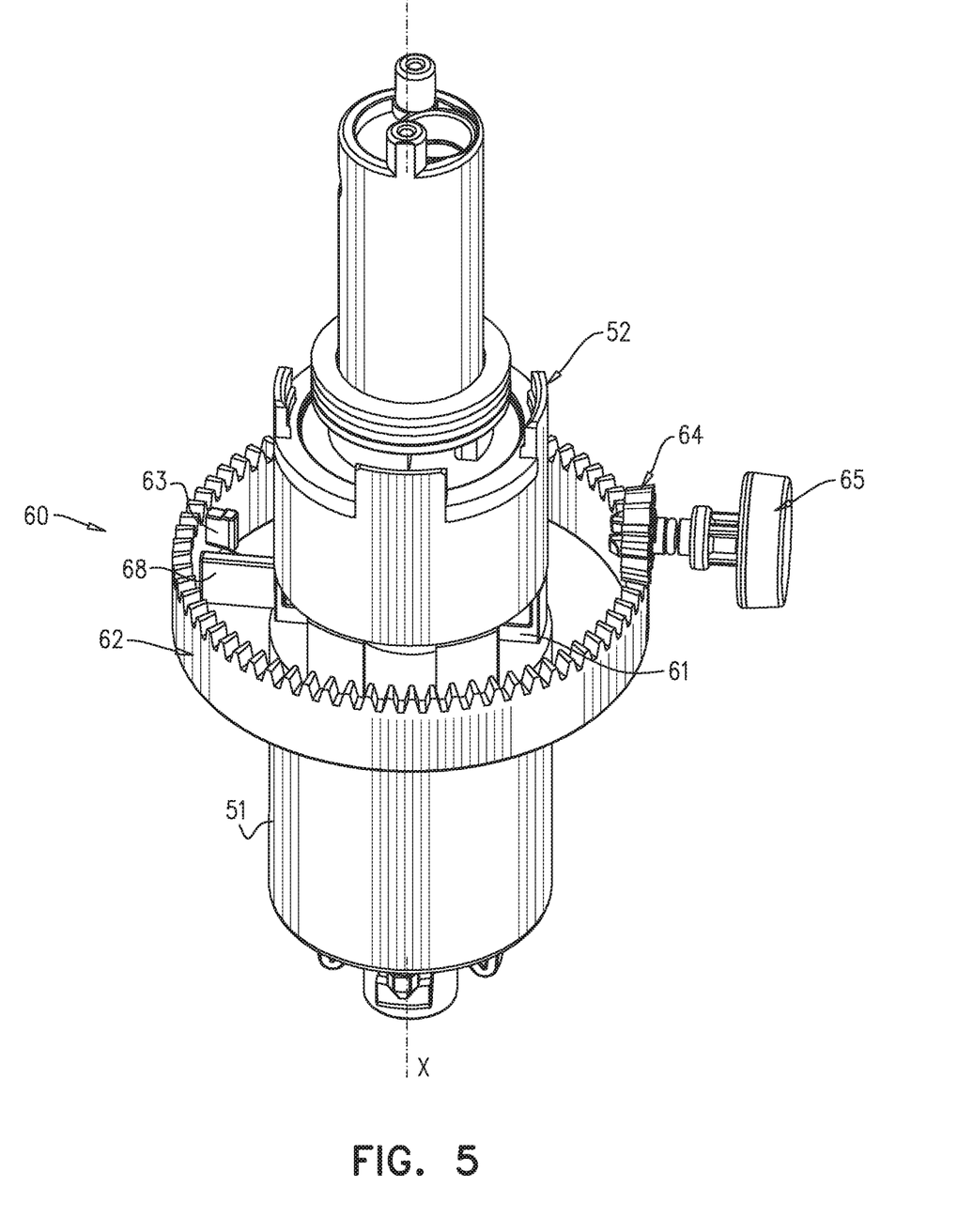
FIG. 5 is a schematic perspective view of a rotation limit and a motor units within one embodiment of a sprinkler

Turning to FIG. 5, in order to further control the irrigation pattern of the rotary sprinkler, the sprinkler can comprise a rotation limiting unit 60 for limiting the angle in which the irrigation head 3 can rotate about the X-X axis.

In the described example, the rotation limiting unit can comprise a direction changer 61 and a static adjustment ring 62. The direction changer 61 is fixed between a motor gear housing 51 and the turbine housing 52 and is configured for receiving the rotational movement of the sprinkler. A rotation flange 68 is formed on the changer 61 and protrudes away from axis X-X towards the internal side of the adjustment ring 62.

The static adjustment ring 62 coincides with the inner circular wall of the sprinkler base housing 2 at a vertical position adapted to allow a rib 63, formed at the internal wall of ring 62, to face flange 68 during the rotation of direction changer 61.

A rotatable adjustment knob 65 extends through the sprinkler base housing 2 into its internal side, while maintaining the sprinkler base housing 2 sealed. The rotational movement of the knob is transmitted to the ring 62 by an adjustment gear 64 which interengages the adjustment ring 62, on which a gear is formed.

In operation, when turning knob 65, its rotational movement is transmitted through gear 64 to ring 62, the rotational movement of ring 62 adjusts the circular location of the rotation rib 63. The rotation of the sprinkler head around axis X-X will be limited to stop when flange 68 encounters rib 63.

In assembly, after mounting the sprinkler onto the main feed line in order to irrigate a certain area, the following adjustments can be made:
the biasing elements 11 can be adjusted within the respective positioning hole of the static control base 10 according to the geometric shape of the perimeter of the area to be irrigated;
the ratio between the extent of deflection of the two arms due to the rotation of the transmission mechanism 17 can be controlled by the adjustment of the corresponding interengaged transmission arms 24 and 15. This enables suiting the change of the flow rate through the long-range nozzle 9 obtained due to the operation of the flow regulating arm 21, to the interference of the deflector arm 16 with the liquid jet and vice versa.
the angle in which the irrigation head 3 can rotate about the X-X axis, can be adjusted by turning the knob 65, hence, setting the limiting position of flange 68.

In operation of the sprinkler, liquid from the feed line on which the sprinkler is fixed, enters the flow chamber 70 of the sprinkler base housing 2. Part of the liquid flows through the hydraulic motor 50, resulting in the rotation of the irrigation head 3 with respect to the sprinkler base housing 2 of the sprinkler. When exiting the hydraulic motor 50, the liquid further flows through the first feed line 74, within neck 5 to the short-range nozzle 8 and provides a constant amount of liquid at a constant angle to the area to be irrigated. The liquid that flows, directly through neck 5, through the second feed line 75, reaches the flow control chamber 9a within the irrigation head 3, where it can be obstructed by the proximal end 28 of the plunger 25, to an extent determining the amount of water to pass towards the long-range nozzle 9, in correspondence with the extent of the radial protrusion of the biasing elements 11.

After reaches the long-range nozzle 9, the liquid jet emitted out of the nozzle can be obstructed by the deflecting portion 16a of the liquid deflector 14, determining the actual irrigation range.

Thus, in each direction the discharge nozzles are oriented, the angle of the discharged jet and the liquid flow rate can be different, allowing the coverage of virtually any geometric planar shape of irrigation area. Furthermore, a correspondence between the deflection extent of the liquid by the liquid deflector 14 and the obstruction of the liquid flow by the flow regulator 20 provides substantially uniform precipitation of water across all of the irrigated area.

Whilst one sprinkler has been described above in detail and shown in the drawings, it is to be understood that other sprinklers can be designed based on the principles of the presently disclosed subject matter, having one or more elements different from those of the described sprinkler. For example:
the sprinkler head can comprise a single nozzle with the varying parameters as described above, operated by a non-hydraulic motor;
the sprinkler can comprise more than two nozzles having such varying parameters;
the number of feed lines can be different from that of the nozzles, meaning that one nozzle can have fluid communication with more than one feed line;
the sprinkler base housing fitted to the liquid supply line, can be static or can be rotatable, while allowing the irrigation head to rotate relative to the sprinkler base housing about axis X-X;
the flow regulator arm 21, the ends of plunger 25, and the flow control chamber 9a, can be formed in shapes and dimensions to suit a desired control of the flow rate of liquid therefrom into the long-range nozzle 9;
the nozzle outlets can be exchangeable in order to select the best form to suit the desired liquid jet parameters.

The invention claimed is:

1. A rotary sprinkler, comprising:
a sprinkler base housing;
an irrigation head rotatable about a longitudinal vertical axis of the rotary sprinkler and having one or more nozzles associated with liquid feed lines that extend thereto from the sprinkler base housing;
an irrigation control unit including a plurality of dynamic controllers and operable so that during rotation of the irrigation head a flow rate and a spread of liquid discharged therethrough is variable for at least one of the one or more nozzles, wherein a majority of the plurality of dynamic controllers are located within the irrigation head and are rotatable therewith and the rotatable irrigation head comprises a cover for preventing exposure of the plurality of dynamic controllers to an exterior of the sprinkler, the plurality of dynamic controllers including at least:
- a flow deflecting mechanism comprising a deflector arm configured to interfere with a liquid jet discharged from the at least one of the one or more nozzles in order to affect the angle and range of the liquid jet, and
- a flow regulator mechanism comprising a flow regulator arm, whose movement, at least indirectly, results in reducing the cross-sectional area of liquid flow towards at least one of the one or more nozzles; and a static biasing control base constituting a part of the irrigation control unit and located below the irrigation head, wherein the static biasing control base includes an array of biasing elements positioned to bias a cam follower configured to rotate together with the irrigation head, the cam follower being further configured to transfer a rotational displacement thereof to the flow regulator arm and deflector arm, and wherein the transfer of the rotational displacement to the flow regulator arm and the deflector arm is configured to be performed through respective gear elements.

2. The rotary sprinkler of claim 1, wherein the static biasing control base is located between the sprinkler base housing and the irrigation head.

3. The rotary sprinkler of claim 1, wherein the respective gear elements are adjustable to control a ratio between an extent of deflection of the flow regulator arm and the deflector arm due to rotation of the cam follower.

4. The rotary sprinkler of claim 3, wherein said adjustment can be performed at least during assembly of the rotary sprinkler.

5. The rotary sprinkler of claim 1, wherein a position of biasing elements of the array of biasing elements is adjustable to suit displacement of the plurality of dynamic controllers during rotation of the irrigation head to a desired irrigation pattern.

6. The rotary sprinkler of claim 1, wherein an angle, within which the irrigation head is rotatable, is adjustable to allow avoiding irrigation in pre-determined directions.

7. The rotary sprinkler of claim 1, wherein the cover is formed with designated openings for the one or more nozzles allowing the liquid jet to be discharged freely therethrough, without being interfered by any elements of the rotary sprinkler except for the flow deflector arm.

* * * * *